United States Patent
Nitsche et al.

(10) Patent No.: US 8,101,299 B2
(45) Date of Patent: Jan. 24, 2012

(54) METHOD FOR PRODUCING, MATURING AND DRYING NEGATIVE AND POSITIVE PLATES FOR LEAD ACCUMULATORS

(75) Inventors: Werner Nitsche, Lippstadt (DE); Uwe Schwinhorst, Telgte (DE)

(73) Assignee: Bernd Muenstermann GmbH & Co. KG, Telgte (DE)

( * ) Notice: Subject to any disclaimer, the term of this patent is extended or adjusted under 35 U.S.C. 154(b) by 1091 days.

(21) Appl. No.: 11/915,258

(22) PCT Filed: May 24, 2006

(86) PCT No.: PCT/EP2006/004921
§ 371 (c)(1),
(2), (4) Date: Nov. 21, 2007

(87) PCT Pub. No.: WO2006/128621
PCT Pub. Date: Dec. 7, 2006

(65) Prior Publication Data
US 2008/0196241 A1    Aug. 21, 2008

(30) Foreign Application Priority Data
May 28, 2005  (DE) .................. 10 2005 024 526

(51) Int. Cl.
*H01M 10/12* (2006.01)
(52) U.S. Cl. ......... 429/225; 429/209; 429/227; 429/228
(58) Field of Classification Search ........... 429/227, 429/209, 228, 225
See application file for complete search history.

(56) References Cited

U.S. PATENT DOCUMENTS

| | | | |
|---|---|---|---|
| 5,384,217 A | 1/1995 | Binder | |
| 2004/0121233 A1 | 6/2004 | Klein et al. | |

FOREIGN PATENT DOCUMENTS

| | | |
|---|---|---|
| GB | 1163082 | 9/1969 |
| JP | 10 149815 | 6/1998 |
| JP | 2002/313333 | 10/2002 |

*Primary Examiner* — Jane Rhee
(74) *Attorney, Agent, or Firm* — Greer, Burns & Crain, Ltd.

(57) ABSTRACT

A method for producing, maturing and drying negative and positive plates for lead accumulators during which, in a pasting step, the plates are manufactured by introducing lead paste serving as an active material into an electrode support. The plates are directly placed one atop the other in stacks; the plates are matured at temperatures higher than 70° C. while maintaining a residual moisture of the active material, which prevents or reduces a spontaneous oxidation of the lead oxides, to form a porous cross-linked structure comprised of 3- and/or 4-basic lead sulfates, the 3- and/or 4-basic lead sulfates having a greater density than that of the active material that forms the starting material, and; the plates are dried to a desired final moisture while exploiting a permeability, which is suited for the active material due to the porosity resulting from the maturing, and the oxidation of lead remaining in the active material in the plate stack by applying an overpressure or underpressure, which has a pressure difference of more than 10 mbar between an inflow side and an outflow side of the plate stack, by means of oxygen-containing gas flowing through the active material.

18 Claims, 2 Drawing Sheets

METHOD FOR PRODUCING, MATURING AND DRYING NEGATIVE AND POSITIVE PLATES FOR LEAD ACCUMULATORS

BACKGROUND OF THE INVENTION

The present invention relates to a method for producing, maturing and drying negative and positive plates for lead accumulators, initially, in a pasting step, the plates being produced by bringing in the lead paste, consisting of the main components of lead oxide, water and sulfuric acid, as active composition in an electrode support.

According to the prior art, known from the relevant practice, lead accumulators are produced by producing the active compositions for the negative and positive plates from the main components lead oxide, water and sulfuric acid. These materials are processed in a mixing process into a pasty lead paste. Within the mixing process, additives, which are usually referred to as spreading agents and are essentially barium sulfate, carbon black as well as special forms of lignin compounds and/or humic acid, are also added to the negatively active compositions. The negative and positive plates are produced by bringing the negative, active composition or the positive active composition into an electrode support. The introduction of the pasty lead paste into the electrode support is referred to as pasting and usually is accomplished by machine on appropriate pasting lines, which consist, essentially, of a pasting machine and a downstream pre-dryer.

The pre-dryer superficially dries the plates, so that tack-free and, with that, stackable plates are obtained. When stacking the plates, a residual moisture content of the active composition of less than 9% by weight is usually aimed for, in order to avoid adhesion of the plates.

For continuously produced electrode supports, release paper, which permits an increase in the residual moisture up to approximately 12% by weight, is applied on the upper and lower side of the plates produced.

Usually, gravity casting lattices or metal mesh lattices or continuously cast or stamped lattices are used as electrode supports.

The plates usually are stacked prone at the end of the pasting line predominantly fully automatically, partially also manually and are deposited vertically or predominantly horizontally on pallets. In the case of gravity casting lattices, double plates are partly also suspended loosely in frames.

The active compositions are converted in a subsequent step of the process, the so-called maturing and drying step, into a porous, cross linked structure, preferably of tribasic and/or tetrabasic lead sulfate crystals and the active composition is tied to the electrode support by an oxidation of the surface of the electrode support. By means of the quality of the cross linking of the tribasic and/or tetrabasic lead sulfate crystals, by the extent of the porosity of the active composition, as well as by the tying to the electrode support, this step of the process essentially determines the electrical performance data and the service life of the lead accumulator.

According to the prior art, the maturing and drying takes place almost exclusively in batch chambers, which provide temperature and humidity control during the maturing phase and drying during the drying phase.

Dusty lead oxides, containing an appreciable amount of unoxidized lead, are used for the production of lead accumulators. The lead oxides used usually contain 25% to 35% by weight of unoxidized lead. During the maturing, there is an exothermic oxidation of the residual lead of the lead oxides used. The exothermic reaction depends essentially on the method, by which the lead dust is produced. As a rule of thumb, lead oxides, produced by the Barton method, tend to oxidize spontaneously less than do lead oxides from lead mills. There are also appreciable differences between the plants of different manufacturers with respect to the rate of spontaneous oxidation of the lead oxides.

The spontaneous oxidation of the lead oxides within the active compositions in the finished electrode supports always takes place preferably at a moisture content of 5 to 7% by weight of the active composition. The active composition accordingly tends to oxidize during the maturing. For its part, the exothermic reaction during the oxidation increases the drying of the active composition. Therefore, during the maturing, the charging time of the batch chambers, as well as the total maturing time for forming a tribasic and/or tetrabasic lead sulfate crystalline framework should therefore be kept a short as possible, in order to avoid any drying out, because this drying out would counteract the formation of a stable crystalline framework as well as a good chemical bonding to the electrode support.

The usual batch chambers for maturing and drying plates for lead accumulators have the capacity to accommodate several hours, usually 8 to 16 hours, of production. Negative and positive plates usually are matured within 16 to 24 hours to tribasic lead sulfate crystals and subsequently dried for 1 to 3 days.

The maturing to tetrabasic lead sulfate crystals has increasingly gained in importance with the introduction of electrode supports based on calcium alloys for positive plates. Tetrabasic crystalline structures occur only at temperatures above about 70° C., are formed at a relatively high humidity within about 2 to 6 hours, but have very large crystals, which have a negative effect on the internal surface area of the porous electrodes and require a distinctly longer formation time of the electrodes with an increased requirement for electrical energy. Advantageously, however, positive plates with tetrabasic lead sulfate crystals have an improved service life as well as protection against passivation in the case of an excessive discharge (antimony-free effect).

For the production of active compositions for positive plates, the size of the tetrabasic crystals can be controlled by the addition of micronized tetrabasic lead sulfate. Crystals, comparable in size to those of tribasic lead sulfates, can be produced. The concept of micronized tetrabasic lead sulfate is understood to refer to crystal sizes of less than 1 μm of comminuted tetrabasic lead sulfate with the addition of finely divided pyrogenic silica, as described in the document WO2004/059772 A2. The positive, active composition is added during the production of the tetrabasic micronized lead sulfate. During the subsequent maturing at elevated temperatures, preferably in an atmosphere saturated with water vapor, a complete small tetrabasic crystalline structure is formed already within one hour. This also is described in the document WO2004/059772 A2.

According to the prior art, the rapid maturing of plates for lead accumulators in the case of freely exposed surfaces is known. In the document EP 0 949 700 B1, a method is described, in which lead plates are matured and dried within a few hours in a continuous 3-step process. It is described that the moisture content of the plates is controlled by means of the use of a humidity-controlling membrane and by means of a plate surface, which is kept free for a uniform treatment. Due to the exposed surfaces, the metal of the residual lead is broken down and rapid drying can take place. It is an important prerequisite of the method that both surfaces of the plate are kept free for a uniform treatment and are provided with a humidity-controlling membrane, which can transport and store moisture. The use of the separator, which is a component of lead accumulators, as the humidity-controlling membrane, is proposed as a particularly advantageous solution.

The EP 1 235 287 A1 also shows a method for maturing positive lead accumulator plates, for which it is important to isolate the plates. In a further development of claim 4 of this publication, the plates are isolated by separating them by means of a humidity-controlling membrane. By these means, it is intended to achieve that a water vapor treatment for maturing the plates has to be carried out only for a few hours. This is attributed especially to the fact that the plates for the maturing process are isolated. The isolation should take place at least during the treatment with water vapor.

For the usual manufacturing technology described above, it is not necessary to keep the two plate surfaces free or provide them with a humidity-controlling membrane. Rather, the usual practice is to stack the plates after they are pasted without any humidity-controlling membrane and without a space between the plates. For this reason, the technique of maturing plates rapidly of the EP 0 949 700 B1 or of the EP 1 235 287 A1 cannot be used without major changes with respect to the plant technology. The high investment costs and the complex technical realization for introducing the humidity-controlling membranes oppose the spread of the technology described in the EP 0 949 700 B1 and the EP 1 235 287 A1.

One possibility for keeping the surfaces of plates, stacked in stacks, free without introducing humidity-controlling membranes, consists of using supporting racks or frames, in which the plates are disposed with essentially a vertical alignment. At the same time, in these carrier racks or frames, due to the movement clearance required for loading and unloading, the stacks of plates experience a loosening, which to some extent produces exposed surfaces with very small gaps. For this purpose, the plates must be placed upright, in order to achieve the certain loosening of the plates, which thereafter are standing on the carrier rack or on the frame. The dimensions of the stack of plates must therefore be less than the clear width of the carrier rack or frame. Plate stacks, in which the plates are stacked horizontally, cannot be used here. It is a disadvantage of this method that it is necessary to use carrier racks or frames, which are matched to the special geometry of the plates. Changing the plate geometry also necessarily requires a change in the carrier rack or frame or the use and exchange of exchangeable inserts in the carrier racks or frames.

It is therefore an objective to provide a method of the type named above, which avoids the disadvantages of the prior art, which have been explained above, and with which plates with improved properties can be produced with great economic efficiency.

SUMMARY OF THE INVENTION

Pursuant to the invention, this objective is accomplished with a method of the type named above, which is characterized in that the plates are disposed in direct contact with one another in stacks, at temperatures above 70° C., while maintaining a residual moisture content of the active composition, which avoids or reduces any spontaneous oxidation of the lead oxides, the plates are matured into a porous, cross linked structure of tribasic and/or tetrabasic lead sulfates, the tribasic and/or tetrabasic lead sulfates having a higher density than the active compositions forming the starting material and, utilizing a permeability of the active composition, resulting from the porosity that has been developed by the maturing and from the oxidation of the residual lead in the active composition in the stack of plates by the application of a pressure or vacuum, which produces a pressure difference of more than 10 mbar between the inflow and outflow sides of the stack of plates, the plates are dried to a desired, final moisture content by means of the oxygen-containing gas flowing through the active composition.

Advantageous embodiments and further developments of the inventive method are given in the dependent claims.

By means of the invention, it is advantageously achieved that positive as well as negative plates in stacks can be matured and dried in a short time without using humidity-controlling membranes, without the need for exposed surfaces and without using supporting racks. The invention is based on the realization that, contrary to prevalent teaching opinion, negative and positive plates for lead accumulators have a remaining permeability, which, for the purpose of oxidation of the residual lead as well as of drying, ensures a sufficient passage of a gas when the aforementioned pressure or vacuum is applied. The gas thus flows through the material comprising the plates. This permeability can be used by a pressure or vacuum applied in such a manner, that drying to the desired low residual moisture content is ensured in a relatively short time essentially by an oxidation of the residual lead. Utilizing the permeability of the active compositions, the rapid drying to a low residual moisture content by the oxidation of the residual lead advantageously leads to an increase in the porosity of the negative as well as of the positive plates and provides crack-free plates.

On the other hand, in the case of the known methods of the prior art, the disadvantage arises that, at a relatively low moisture content of, for example, about 5 to 7% by weight, spontaneous oxidation of the lead oxides takes place, which, in an undesirable manner, increases the drying out of the active composition. In order to avoid this undesirable effect, provisions are made pursuant to the invention that the residual moisture content is kept so high during the maturing, that a spontaneous oxidation of the lead oxides is avoided or, at the very least, decreased.

During the inventive maturing of the active composition, crystals in the form of tribasic and/or tetrabasic lead sulfates are formed from the paste constituting the basic material. In practice, the paste has a density ranging from 3.8 to 4.4 g/cc. On the other hand, tribasic lead sulfate in crystalline form has a density of 6.7 g/cc and tetrabasic lead sulfate in crystalline form has a density of 8.0 g/cc. This means that, as a result of the increased density, spaces are advantageously formed between the crystals during the maturing and lead to the desired porosity.

Pursuant to the invention, the plates are disposed in stacks in direct contact with one another and are matured and dried in this stacked state. Each stack of plates thus forms a compact body, in which the individual plates are disposed without there being any spaces between them. By carrying out the maturing process pursuant to the invention, a porosity of the plates results, which is utilized for passing a gas through the plates for the purpose of drying the plates in the stack. In principle, the gas can flow through the stack of plates in any direction. At most, there may be differences in flow resistance in the different directions of the stack of plates. By adapting the pressure difference, it is possible to react to these different flow resistances in order to achieve a sufficient throughput of gas for the drying at all times.

The actual final moisture content depends on the intended use of the plates, since different residual moisture contents are appropriate for plates in different batteries. For dry, precharged batteries, the plates, after the maturing and drying, are inserted in cassettes for forming. A relatively high residual moisture content of about 2% by weight is desirable for avoiding dust during the loading of the cassettes. In contrast to this, a residual moisture content, which is as low as possible and as uniform as possible, is desired for conventional passenger car batteries, which are delivered wet, in order to ensure the lowest possible fluctuation in the final acid density of the finished battery.

The maturing, that is, the formation of the tribasic and/or tetrabasic lead sulfate crystals, takes place at temperatures above 70° C. and, preferably, at a relative humidity of more than 80%. Preferably, the temperature is even above 80° C. Preferably, steam is used for transporting heat during the maturing, in order to avoid supplying additional oxygen.

The maturing takes place over a period of at least 30 minutes. Since the plates are in stacks, any undesirable drying of the plates can be avoided already at relative humidities of 80%. A maturing time of 1 hour is preferred. However, to improve the surface corrosion of particularly stable electrode support alloys, such as PbCaAg or PbSn alloys, in exceptional cases or when crystallization retarders, such as lignin sulfates or humic acids, are present, these times may be extended, preferably up to 3 hours. From a plant design point of view, steam is preferably passed into the bottom region of a maturing chamber for heating the plates. Forced circulation by blowers or forced convection advantageously is deliberately avoided here, since this leads to an unwanted drying of the outer plates of the stack.

Immediately after the maturing, the inventive drying of the plates is commenced with utilization of the permeability of the active compositions. As a result of the permeability of the active compositions, oxygen for oxidizing the free lead in the active composition to lead oxide is supplied by a pressure drop of more than 10 mbar and preferably of more than 40 mbar. The exothermic reaction of the oxidation of the residual lead provides a significant component of the energy required for drying the plates.

The use of compressed air, which, on the one hand, supplies very dry air and, on the other, maintains a sufficient oxygen content, has proven to be advantageous.

In order to ensure that sufficient lead is broken down to lead oxide, the oxygen content during the drying is advisably maintained at the natural oxygen content of air of about 20% by volume, at least, however, at 15% by volume. In this connection, it is necessary to take care that sufficient consumed, oxygen depleted air is exchanged for fresh air.

The temperature during the drying advantageously is maintained between 50° and 70° C. preferably over a period of about one hour. In this temperature range, there is an optimum breakdown of lead to lead oxide.

By enriching the oxygen content of the air, which is passed through the active composition, to a value of above 40% by volume, the time, required for the breakdown of the lead to lead oxide can be shortened to less than 30 minutes. For reasons of costs, this variation of the inventive method may admittedly, at the present time, be of subordinate importance; however, in special cases, it may be of advantage. By enriching the oxygen content to a value above 40% by volume, the drying can take place without air heaters and without equipment for producing air at an elevated or reduced pressure, due to the spontaneous oxidation of the residual lead. This is of technical importance for lead dusts from mill production with a high tendency to oxidize.

The final drying of the plates is accomplished over an advantageously relatively short period preferably, of about 30 minutes to 2 hours by a suitable pressure difference at a temperature, which corresponds at least to the boiling point of water and which preferably at atmospheric pressure at sea level is a little above 105° to 115° C. After this period, the final moisture content is less than 0.5% by weight. Depending on the final moisture content desired, the final drying step of the process can also be shortened or, in special cases, be omitted completely. When mill dust, which has a high tendency to oxidize and a high residual lead content, is used, the final drying usually takes place in clearly shorter times than the final drying of plates, which are made from red dust according to the Barton process.

The above-described method, which, because of the short time required, can be referred to as rapid maturing and rapid drying, can be used for all negative and positive plates for lead accumulators in stacks without changing the existing plant technique during the pasting and stacking of the plates. The use of micronized tetrabasic lead sulfate is particularly advantageous for high-current batteries, since this use guarantees small tetrabasic lead sulfate crystals for positive as well as negative plates with a high internal surface area.

An important point of the invention is realization that, at a pressure difference of at least 10 mbar and advantageously of at least 40 mbar, the active compositions of positive as well as of negative plates in the stack have a sufficient permeability for an oxygen-containing gas, such as air, in order to ensure drying essentially by an oxidation of the residual lead to the residual moisture content of about 2% by weight.

When constructing technical facilities for implementing the method, care must be taken to ensure that infiltrated air cannot flow past the stack of plates. For this purpose, appropriate measures, such as providing seals, are to be taken.

A further important point of the invention is realization that, due to the rapid drying by means of the oxidation and by means of utilizing the gas permeability of the active composition, the porosity of the finished plates is increased by about 5% to 7% over that of plates from a conventional batch maturing or over that of plates, which were matured according to the methods named in the EP 0 949 700 B1 or in the EP 1 235 287 A1. Investigations have shown that, during a slow drying over a period of a day in batch chambers or when drying isolated plates, a drying loss leads to shrinkage of the active composition and to a decrease in porosity. On the other hand, when drying rapidly by oxidation of the residual lead within a period of, for example, 1 to 2 hours by using the gas permeability of the active compositions and maintaining a suitable pressure drop as well as by supplying sufficient oxygen in accordance with the above description of the inventive method, there is no loss on drying, which leads to shrinkage of the active compositions. Visually, the active compositions of plates, produced by conventional methods that are not of the invention, show cracks, preferably in the region of the carrier rack of the electrode support. The cracks are particularly visible in the active compositions of the negative plates, which generally, as a result of the spreading agent contained, are more alkaline and have a density higher than that of the positive plates. On the other hand, in the case of the inventive method, crack-free plates are obtained because there are no drying losses. At the same time, the negative and positive compositions have a higher porosity.

The present invention offers a series of economic advantages over the prior art.

The porosity of the active compositions in the negative and positive plates is 5% to 7% higher than that of the prior art. The active composition per plate can therefore be reduced by almost the same factor of 5% to 7% while retaining the electrical properties, because, in the case of high current applications such as starter batteries, only the amount of electrolyte, stored in the pores, is of decisive importance. The acid density in the pores determines the terminal voltage of the battery. The exchange of acid during high current uses is of subordinate importance. The porosity is also of importance for the capacity of lead accumulators, since the negative and positive plates experience during a discharge an increase in volume, which decreases the porosity until the pores, at the end of the discharge, have almost no free volume any more. The amount of energy, which can be removed, depends therefore directly on the porosity.

During the inventive rapid maturing, only small maturing chambers are required, so that the procurement costs are less than for conventional maturing and drying chambers. The costs of maturing and drying chambers are essentially proportional to the circumferential surface of the enclosed space.

The rapid inventive maturing makes continuous production possible, so that storage areas, expenses for logistics as well as interim warehouses may be omitted. By these means, logistic costs and tied-up capital can be reduced.

The short process time makes a high material turnover possible. Even if the rapid maturing and rapid drying is carried out in a batch operation, the plates, after being pasted, can be supplied to the further manufacturing process after at most 2 to 6 hours. Drying out of the plates due to the oxidation of the residual lead can be excluded. This has appreciable positive effects on the quality of the plates. Experience has shown that the clearly lower fluctuation in the plate quality leads to an approximately 3% savings in composition.

The clearly improved drying process, which is carried out effectively pursuant to the invention and in which the oxidation of the residual lead is carried out selectively, results in a savings of at least 20% of the energy used.

BRIEF DESCRIPTION OF THE DRAWINGS

The following proposals are available for realizing the conversion of the inventive method of maturing and drying in the stack and are illustrated in the drawing, in which.

DETAILED DESCRIPTION OF THE PREFERRED EMBODIMENTS

Figure 1:
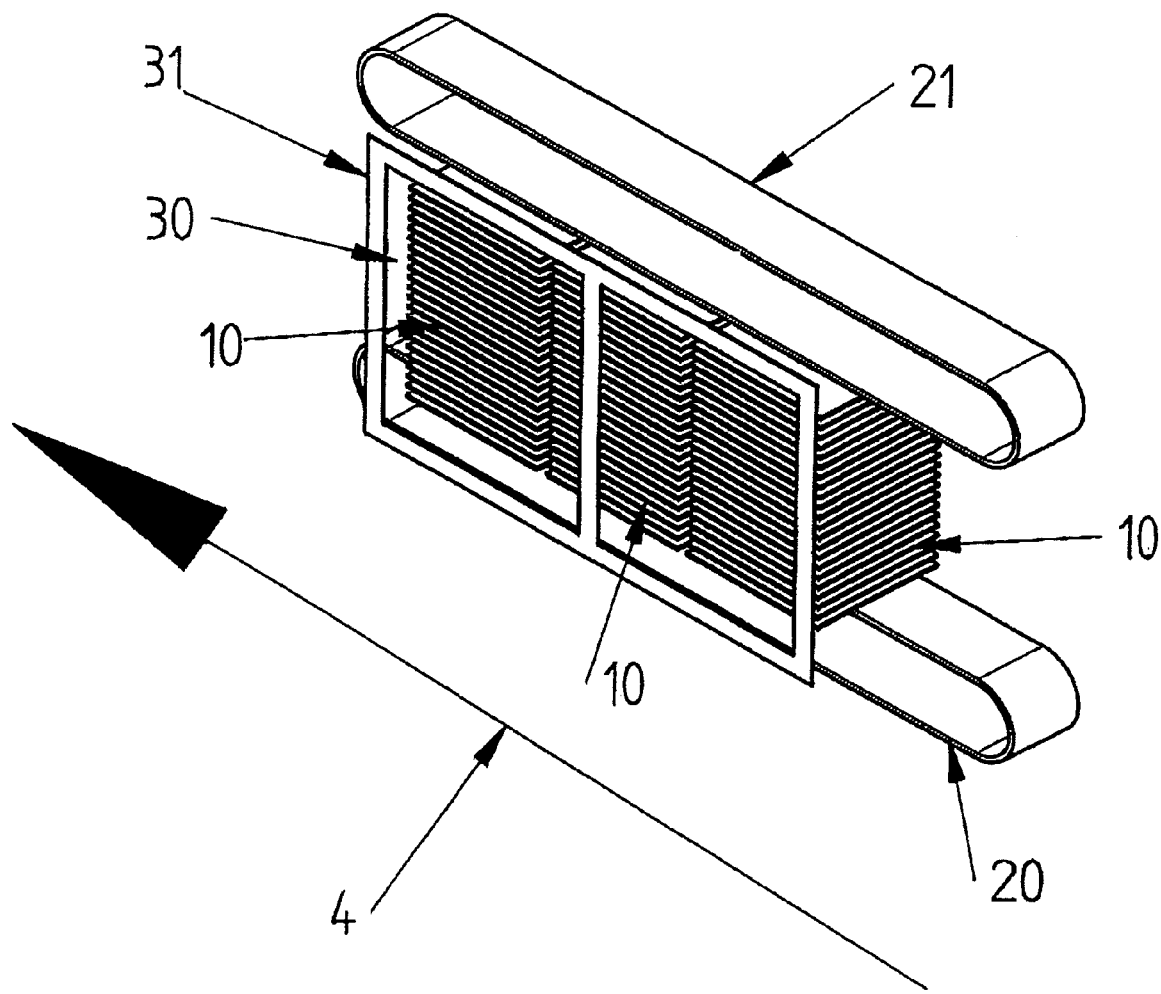
FIG. 1 shows several free-standing stacks of plates in an only partially shown device for passing a gas through the plates in the stack and FIG. 2 shows several stacks of plates in a carrier rack, in which the stacks of plates can be transported by a device, which is not shown here, for passing a gas through the plates in the stack.

According to FIG. 1, several stacks of plates 10, disposed next to one another, with plates jammed together on a conveyor belt, are exposed to a transversely directed pressure difference. In the example shown, the horizontally aligned plates lie tightly on top of one another; alternatively, they may also lie vertically aligned tightly against one another.

The arrow 4 indicates the conveying direction of the conveyor belt 20, which is perpendicular to the pressure drop. Carrier racks or frames are not required. A sufficient pressure drop can be achieved by a flexible fixing and sealing belt 21, which runs along with the conveyor belt, as well as an opening diaphragm 31 with opening areas 30 for the passage of air.

For the technical implementation, it is particularly advantageous that, for this proposed realization example, the installation does not have to be retooled when the dimensions of the plates are changed. Immediately after the pasting, the stack of plates 10 is transferred to the maturing and drying installation.

Figure 2:
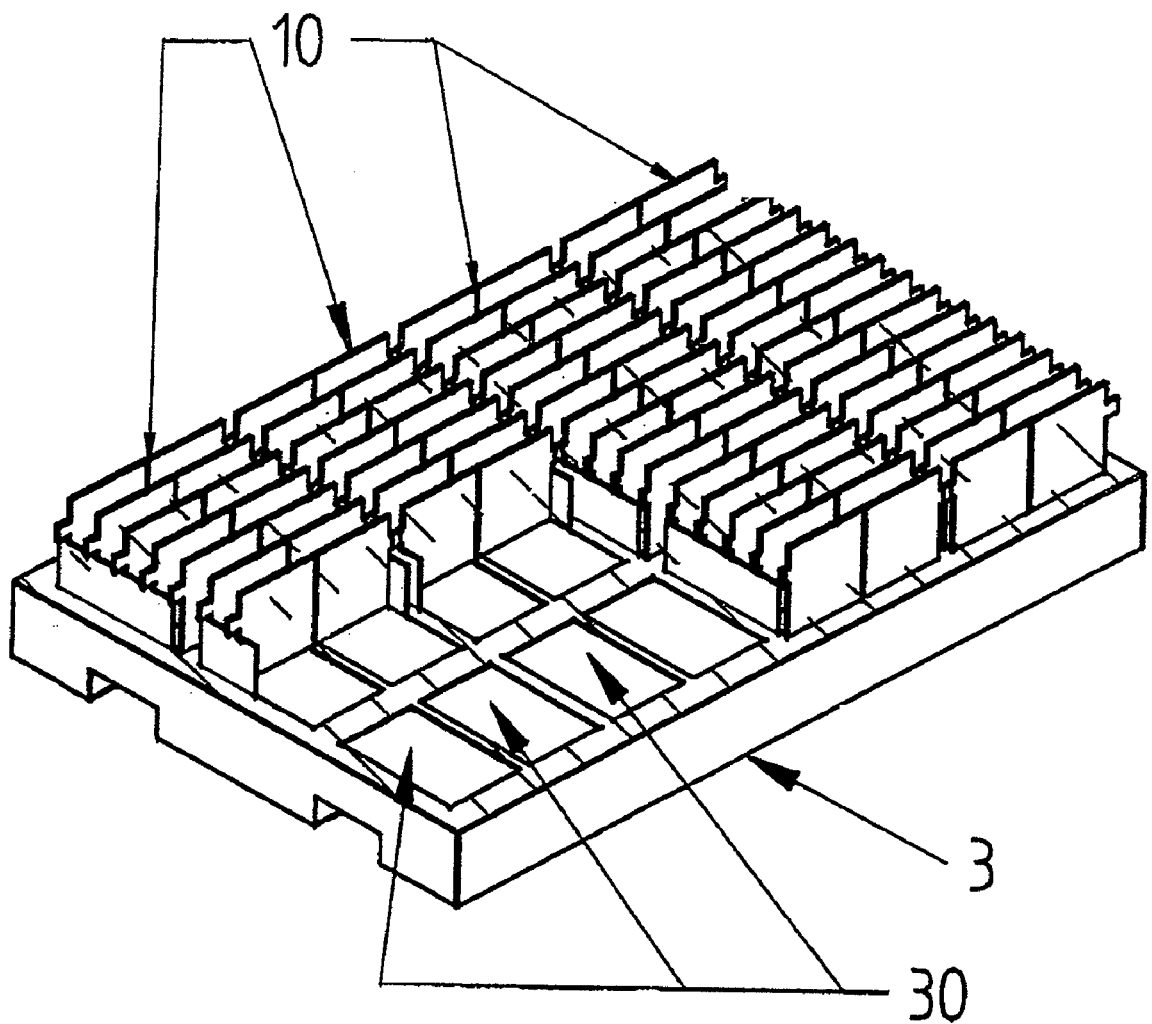

According to FIG. 2, the method can also be used for stacks of plates 10, which are disposed upright or prone in pallets or carrier racks 3. For this, the pallets or carrier racks 3 must have a sufficiently large opening area 30 in the inflow and outflow regions. When carrier racks 3 are used, it is furthermore necessary to take care that a loosening of the stacks of plates 10 cannot take place. For this purpose, clamping devices, for example, may be used, which hold the plates in the stacks 10 sufficiently firmly and tightly together. In the diagrammatic representation in FIG. 2, the plates, for easier identifiability, are shown at a distance from one another; in reality, the plates are tightly in contact with one another, as shown in FIG. 1.

The installations for carrying out the method can be constructed as continuous or as a batch installation.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A method for producing, maturing and drying negative and positive plates for lead accumulators, comprising the steps:
   initially, producing the plates by bringing lead paste, comprising lead oxide, water and sulfuric acid, as an active composition, into an electrode support in a pasting step,
   disposing the plates in direct contact with one another in stacks,
   maturing the plates at temperatures above 70° C. into a porous, cross linked structure of at least one of tribasic and tetrabasic lead sulfates, while maintaining a residual moisture content of the active composition to reduce a spontaneous oxidation of the lead oxides,
   utilizing a permeability of the active composition resulting from the porosity that developed during the maturing step and utilizing an exothermic oxidation of residual lead in the active composition in the stack of plates for producing at least a portion of a drying heat, by applying one of a pressure or vacuum, which has a pressure difference of more than 10 mbar between an inflow side and an outflow side of the stack of plates which is sealed from the inflow side, to result in a flow of an oxygen-containing gas through the plates,
   drying the plates by means of the oxygen-containing gas flowing through the plates comprised of active composition, to a desired final moisture content, at a drying rate which reduces shrinkage of the plates.

2. The method of claim 1, wherein the step of maturing the plates occurs at temperatures above 80° C.

3. The method of claim 1, wherein the step of maturing the plates includes heating the plates by introducing steam into the stack of plates.

4. The method of claim 1, wherein the step of maturing the plates occurs over a period of at least 30 minutes.

5. The method of claim 4, wherein the step of maturing the plates occurs over a period of at least 1 hour.

6. The method of claim 4, wherein the step of maturing the plates occurs over a period of 30 minutes to 3 hours.

7. The method of claim 1, wherein, before the pasting step, a step of adding micronized tetrabasic lead sulfate to the active composition for at least one of the positive and negative plates is performed, as a result of which the active composition is matured completely in accordance with a stoichiometric composition to tetrabasic lead sulfate with defined crystal sizes.

8. The method of claim 1, wherein in the drying step the plates are dried with air as the oxygen-containing gas.

9. The method of claim 8, wherein the air has a temperature of 50° to 70° C.

10. The method of claim 8, wherein the air has an oxygen content of more than 15% by volume.

11. The method of claim 1, wherein the step of applying one of a pressure and a vacuum comprises applying a pressure difference of more than 40 mbar.

12. The method of claim 8, including a step of adding dry compressed air to the air for the drying of the plates.

13. The method of claim 8, including a step of adding sufficient oxygen to the air for drying the plates, so that the air has an oxygen content of more than 20% by volume.

14. The method of claim 8, including a step of adding sufficient oxygen to the air for drying the plates, so that the air has an oxygen content of more than 60% by volume.

15. The method of claim 9, including a final drying step of flowing air through the active composition of the plates at a temperature, in which a temperature of the air corresponds at least to the boiling point of water.

16. The method of claim 15, wherein during the final drying step, the plates are dried to a residual moisture content of the active composition of less than 0.5% by weight.

17. A method for producing, maturing and drying negative and positive plates for lead accumulators, comprising the steps:
   producing the plates by bringing lead paste, comprising lead oxide, water and sulfuric acid, as an active composition, into an electrode support in a pasting step,
   disposing the plates in direct contact with one another in stacks,
   maturing the plates at temperatures above 70° C. into a porous, cross linked structure of at least one of tribasic and tetrabasic lead sulfates, while maintaining a residual moisture content of the active composition at a level sufficient to reduce a spontaneous oxidation of the lead oxides,
   drying the plates to a desired final moisture content, at a drying rate which reduces shrinkage of the plates, by applying a pressure difference across the stack of plates of more than 10 mbar, to result in a flow of an oxygen-containing gas through the plates, and by utilizing an exothermic oxidation of residual lead in the active composition in the stack of plates for producing at least a portion of a drying heat.

18. A method for producing, maturing and drying plates for lead accumulators, comprising the steps:
   producing the plates by bringing lead paste, comprising lead oxide, water and sulfuric acid, as an active composition, into an electrode support in a pasting step,
   disposing the plates in stacks,
   maturing the plates at temperatures above 70° C. into a porous, cross linked structure of at least one of tribasic and tetrabasic lead sulfates, while maintaining a residual moisture content of the active composition at a level sufficient to reduce a spontaneous oxidation of the lead oxides,
   drying the plates to a desired final moisture content, at a drying rate which reduces shrinkage of the plates, by applying a pressure difference across the stack of plates of more than 10 mbar, to result in a flow of an oxygen-containing gas through the plates, and by utilizing an exothermic oxidation of residual lead in the active composition in the stack of plates for producing at least a portion of a drying heat.

* * * * *